(No Model.)  4 Sheets—Sheet 1.
H. J. HAIGHT.
ELECTRIC WIND VANE INDICATOR.
No. 474,735. Patented May 10, 1892.
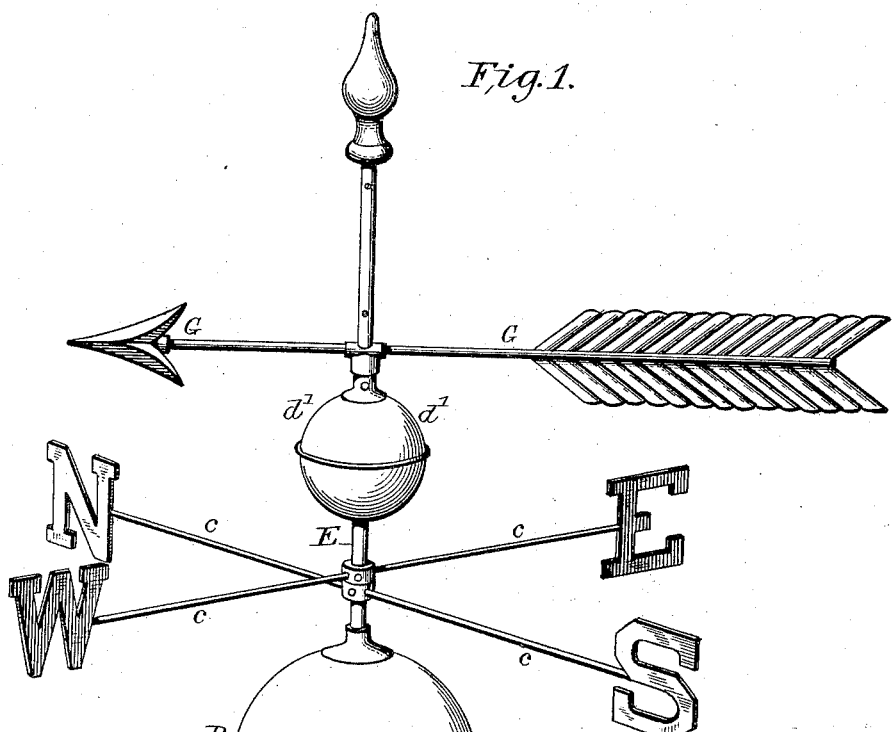
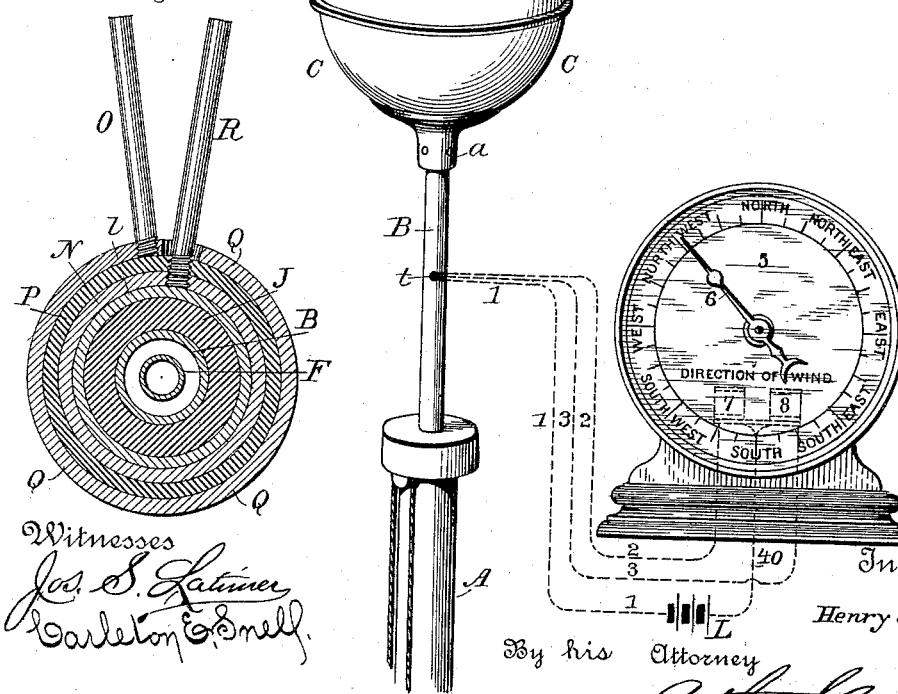
Witnesses  
Jos. S. Latimer  
Carleton E. Snell
Inventor  
Henry J. Haight  
By his Attorney (No Model.) 4 Sheets—Sheet 2.

H. J. HAIGHT.
ELECTRIC WIND VANE INDICATOR.

No. 474,735. Patented May 10, 1892.

Witnesses
Jos. S. Latimer
Carleton E. Snell

Inventor
Henry J. Haight
by Latimer & Browne
his Attorney (No Model.) 4 Sheets—Sheet 3.
H. J. HAIGHT.
ELECTRIC WIND VANE INDICATOR.
No. 474,735. Patented May 10, 1892.
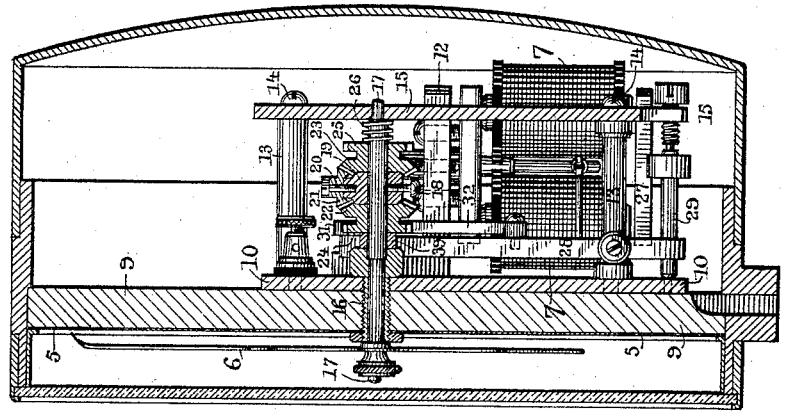
Witnesses
Jos. S. Latimer
Carleton E. Snell
Inventor
Henry J. Haight
By his Attorney (No Model.)  4 Sheets—Sheet 4.

H. J. HAIGHT.
ELECTRIC WIND VANE INDICATOR.

No. 474,735. Patented May 10, 1892.

Witnesses
Jos. S. Latimer
Carleton E. Snell

Inventor
Henry J. Haight
by Arthur T. Brown
his Attorney

UNITED STATES PATENT OFFICE.

HENRY JANSEN HAIGHT, OF NEW YORK, N. Y.

ELECTRIC WIND-VANE INDICATOR.

SPECIFICATION forming part of Letters Patent No. 474,735, dated May 10, 1892.

Application filed October 30, 1891. Serial No. 410,353. (No model.)

*To all whom it may concern:*

Be it known that I, HENRY JANSEN HAIGHT, of the city, county, and State of New York, have invented certain new and useful Improvements in Electrical Wind-Vane Indicators, of which the following is a specification.

The object of the present invention is to enable the position of a wind-vane to be indicated at a distant place or places, so that the direction of the wind can be observed without looking directly at the wind-vane. To enable this to be done, an electrical indicating-instrument is provided at each of the places where the information concerning the wind-vane is required, the indicating-instrument having a movable index, which moves correspondingly with the wind-vane. The movements of the wind-vane are communicated to the index of the indicator by means of an electric circuit, which is opened and closed at proper and frequent intervals by the movement of a circuit-controller operated by connection with the wind-vane. This general object has heretofore been accomplished as is shown by Letters Patent of the United States No. 420,057, granted to me January 28, 1890.

The present invention consists in improvements in the construction of the instrumentalities which accomplish the objects of the invention.

The invention consists in improvements in the construction of the circuit-controller operated by the wind-vane and of the indicating-instrument, which indicates the positions of the wind-vane.

The present improvements are illustrated in the accompanying drawings, wherein—

Figure 2:
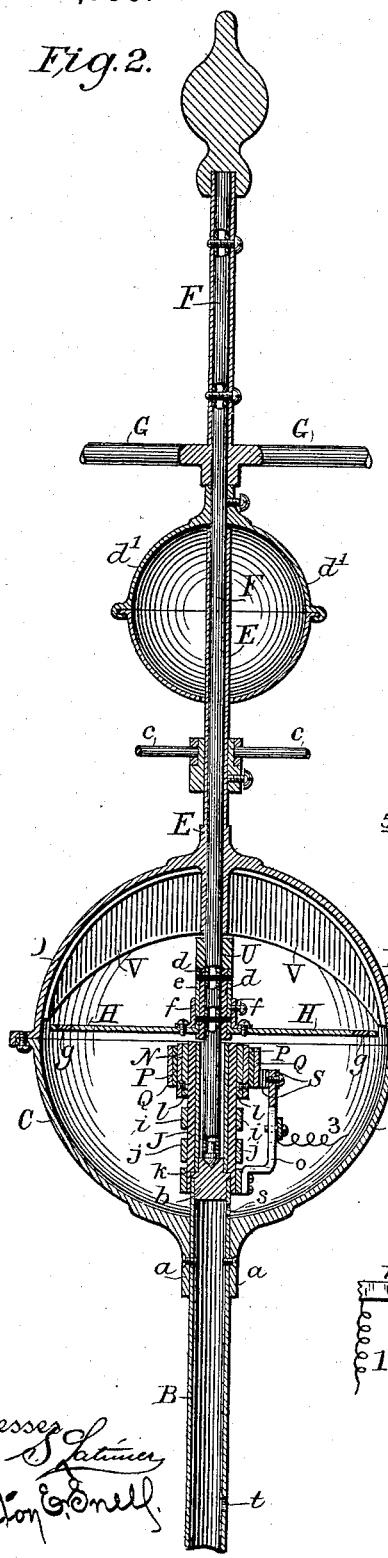
Figure 3:
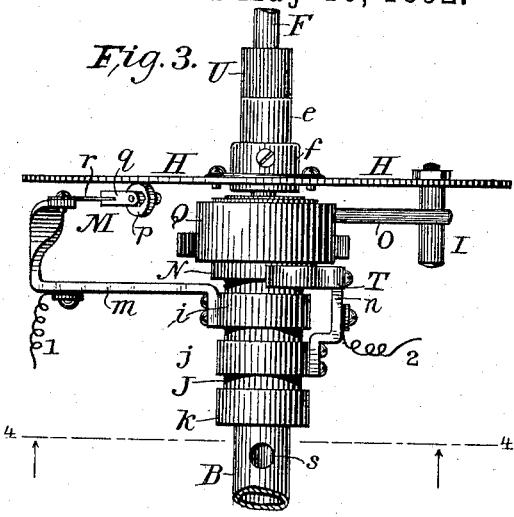
Figure 4:
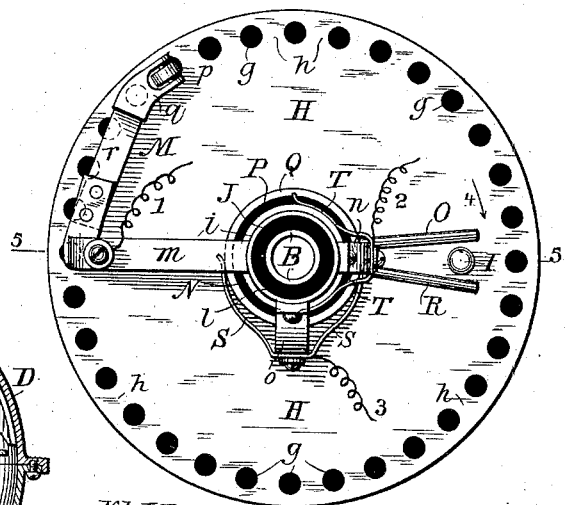
Figure 5:
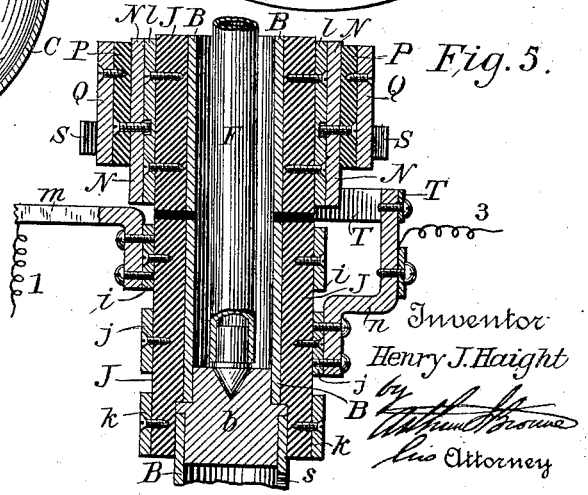
Figure 9:
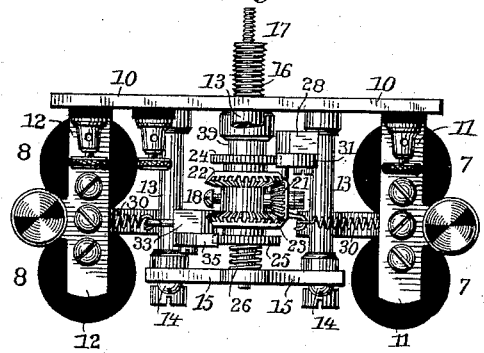
Figure 10:
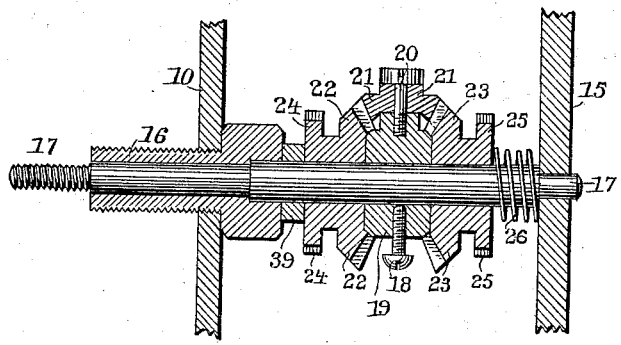
Figure 11:
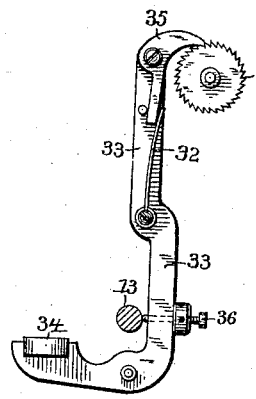
Figure 12:
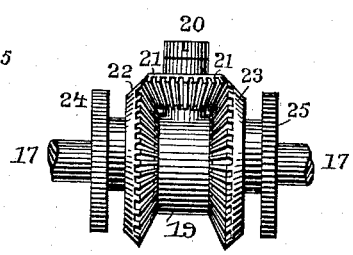

Figure 1 is an exterior view of the wind-vane and of the indicator, showing, also, the line electric wires and the electric generator. Fig. 2 is a central vertical section of the portion of the wind-vane mechanism which carries the circuit-controller. Fig. 3 is an elevation of the part of the wind-vane mechanism constituting the circuit-controller, detached. Fig. 4 is a horizontal section in a plane indicated by the line 4 4 in Fig. 3. Figs. 5 and 6 are details of the circuit-controller on an enlarged scale. Fig. 7 is a rear view of the indicating-instrument, illustrating the operating mechanism thereof. Fig. 8 is a central vertical section thereof. Fig. 9 is a plan view of the indicating-instrument mechanism. Figs. 10, 11, and 12 are detail views thereof.

Referring first to Figs. 1 to 7, the wind-vane and the circuit-controller operated thereby will be described. A is a staff, pole, or other suitable support which carries the wind-vane mechanism and the circuit-controller. To this staff or support A is rigidly secured a vertical hollow metallic tube B. To this supporting-tube is rigidly secured by screws or otherwise the lower half C of a hollow spherical shell, which has an open tubular sleeve a, slipping over the tube B, whereby the hemisphere C is secured to the tube B. The upper half or hemisphere D of the hollow spherical shell is supported by and secured to the lower hemisphere C. The hollow spherical shell thus formed constitutes a tight inclosing casing for the circuit-controlling mechanism. The upper hemisphere D has a central aperture and carries a vertically-extending pipe or elongated sleeve E in line with and communicating with said aperture.

F is the vertical metallic shaft or spindle, which carries the wind-vane G, rigidly connected therewith. This shaft or spindle extends through the elongated guiding-sleeve E, which constitutes both a guide and a bearing therefor, and thence centrally through the hollow spherical shell C D. Its lower end enters the upper end of the vertical tube B and seats upon a step-bearing b, located within said tube. The usual compass-arms c are secured to the sleeve E, and a hollow ornamental sphere or shield d' fits tightly around the spindle or shaft F above sleeve E and below wind-vane G and prevents the possibility of any water entering the hollow spherical casing C D. Within the hollow spherical casing C D the spindle or shaft F carries a horizontal circuit making and breaking disk H, of metal or other electro-conductive material, which is rigidly secured to the said spindle or shaft F, so as rotate therewith. The metallic disk H, while carried by the shaft F, is at the same time insulated therefrom. Immediately surrounding the shaft F is a sleeve d, of hard rubber or equivalent insulating material, and secured to this hard-rubber sleeve is an encircling metallic sleeve e. The central hollow boss f of the disk H is slipped over sleeve e and is rigidly secured thereto by set-screws. The metallic disk H is thus electrically insulated from the shaft F and from all parts in metallic connection therewith. Near its periphery the disk H is provided with a plurality of inserted non-conductive or insulating buttons or sections g, of hard rubber or equivalent insulating material, equidistant radially from the axis of the shaft F and separated from each other by conducting portions or sections h, constituting parts of the metallic disk H, and consequently in electric communication therewith. The under surfaces of the conducting portions h and of the inserted buttons g are flush with each other. The widths of all of the buttons g are uniform, as are also the widths of the intermediate conducting-sections h. The disk H is thus provided with a circle of alternating electro-conductive and non-conductive sections, each pair of sections g h constituting a unit of distance on the disk. The number of these units corresponds with the points of the compass and may correspond with subdivisions of the compass as minute as it may be desired to read. The illustrated disk H has thirty-two conductive sections h and an equal number of non-conductive sections g, which is a proper and convenient number. In addition to this series of sections g h the disk H carries a downwardly-extending vertical metallic circuit-closing pin I in metallic and electrical connection therewith.

The upper end of the supporting-tube or pipe B is surrounded by an immovable sleeve J, of hard rubber or equivalent insulating material, so that all parts carried by said sleeve J are insulated from the supporting-tube. Fastened to the insulating-sleeve J are three fixed separated (and consequently insulated) metallic collars i, j, and k and a metallic sleeve l. The three collars i j k carry, respectively, fixed metallic brackets m, n, and o, and to these brackets are secured electric wires or conductors 1, 2, and 3. Conductor 1 leads to one pole of an electric generator L, and conductors 2 and 3 both lead to the opposite pole of said generator.

The fixed bracket m (on collar i) carries an electrode M, which is held in electrical contact with the under side of the disk H and in the path of the circle of sections g and h. The electrode M consists of a metallic bowl p, journaled in a metallic bearing q, carried on the end of a metallic spring r, secured to the bracket m. The resilience of the spring r holds the bowl p in contact with the circle of sections g h, so that the bowl is at all times in contact either with one of said sections g or with one of said sections h. When the bowl p of the electrode M is in contact with one of the non-conductive sections g, the circuit through the generator L is broken, and when said bowl p is in contact with one of the conductive sections h the circuit through the generator is closed. Since the position of bowl p is stationary while the disk H rotates with the shaft F, it follows that whenever the direction of the wind shifts the circuit through the generator will be made and broken one or more times, depending on the extent of the change in direction.

Encircling the sleeve l at the upper end of the tube B is a rotary metallic sleeve N, the sleeve l constituting a guide and bearing for said sleeve N. This sleeve N is provided with a horizontally and radially extending metallic arm O, which constitutes an electrode and extends into the path of the pin I on the disk H. Surrounding the sleeve N is a sleeve P of insulating material, such as hard rubber, and surrounding this insulating-sleeve P is a metallic sleeve Q. Sleeves P and Q are both rigidly connected to the sleeve N, so that the three sleeves N P Q rotate together around sleeve l, sleeve Q being however insulated from sleeve N by the intermediate sleeve P. The sleeve Q carries a horizontally and radially extending arm R, constituting an electrode, which extends into the path of the stud or pin I on the disk H. The electrodes or arms O R are held separated from each other at an invariable distance that is slightly greater than the diameter of the pin or stud I, which is located between them.

The fixed bracket o on fixed collar k has two spring contacts, electrodes, or brushes S S, which, by the resilience of the metal of which they are composed, press in electrical contact upon the outer surface of the sleeve Q. Consequently electrode R is always in metallic connection with branch return-conductor 3.

The inner rotary metallic sleeve N is of greater width than sleeves P Q, so that a portion of its outer surface is exposed. Against this exposed surface of sleeve N two spring contacts, electrodes, or brushes T T (carried by fixed bracket n on fixed collar j) press in frictional contact by reason of the resilience of the spring metal of which they are composed, so that the electrode O is always in metallic electric connection with the branch return-conductor 2. It consequently follows that, since the pin or stud I is less in diameter than the distance between the electrodes O R, only one of the branch return-conductors 2 3 can be in co-operative relation with the main conductor 1. The particular one of the branch conductors 2 or 3 in operation is determined by the direction in which disk F turns. As long as it turns in one direction (say in the direction of arrow 4) stud or pin I will be in contact with electrode O, and consequently branch conductor 2 will be operative; but if the direction of motion of disk F is reversed stud or pin I will leave electrode O and be brought in contact with the other electrode R, and consequently branch conductor 3 will be operative. The extent of play which the pin or stud I has between the electrodes O R is less than the width of one of the sections g or h, so that the pin or stud I will always be in contact with either O or R when the electrode M opens or closes the circuit by co-operation with said sections $g$ or $h$.

The conducting-wires 1, 2, and 3 are led from their respective brackets $m, n$, and $o$ into the interior of the supporting pipe or tube B through an aperture $s$, which establishes communication between the interior of the hollow spherical shell C D and the interior of the tube B below the step-bearing $b$. The wires are thus led out from the hollow shell C D without necessitating an exposing-opening therein. The wires 1, 2, and 3 pass out from tube B through an aperture $t$ and are thence led in any desired direction.

The insulation of the disk H from the shaft F and of the collars $i j k$ and sleeve $l$ from tube B protect all the parts of the circuit-controller and of the instruments connected with the conductors 1 2 3 from the effects of lightning striking the wind-vane.

A loosely-fitting collar U, of insulating material—say of wood—surrounds the wind-vane shaft F above the disk H and below the strengthening-ribs V, with which the upper half D of the casing C D is provided. This collar U prevents the shaft F from being lifted, and so prevents the disk H from being brought in contact with the metal of which the shell C D is composed. The disk H is thus further protected from lightning.

It will be noted that with the described construction of wind-vane and mechanism operated thereby the shaft F need be a short one only and but little friction is afforded by the moving parts. Consequently the wind-vane is rendered sensitive to very light currents of air, which might otherwise be insufficient to affect it.

The indicating-instrument, which is illustrated in Fig. 1 and in Figs. 8 to 11, inclusive, is one of that class of electric indicating-instruments which comprise a fixed dial or reading-scale 5, an index 6, co-operating therewith and capable of a step-by-step movement in either direction, two electro-receptive devices, such as electro-magnets 7 8, and mechanism intermediate between said electro-receptive devices and said index which moves said index in opposite directions, depending upon which of said electro-receptive devices is actuated by an electric current. Such electric indicating-instruments are shown and described, for example, in Letters Patent of the United States No. 376,149, granted to me January 10, 1888; in Letters Patent of Great Britain No. 20,522, granted to me December 16, 1890, and in a pending application for Letters Patent of the United States, Serial No. 380,612, filed by me February 7, 1891. The present invention (as far as the indicating-instrument is concerned) consists in certain improvements upon the instruments set forth in said application and patents, which will be pointed out in connection with the following detailed description.

The scale 5, index 6, and magnets 7 8 of the indicating-instrument are all supported on a suitable supporting-plate 9, of wood or other suitable insulating material, and to the rear of this plate 9 is rigidly secured a metallic plate 10. On opposite sides of this plate 10 are rigidly mounted two metallic brackets 11 12, which support the magnets 7 8, respectively. Also, rigidly mounted on the plate 10 are three perpendicular metallic posts 13, to which is rigidly secured by screws 14 a T-shaped metallic bridge 15, which is thus held parallel with the plate 10 and in rigid and immovable connection therewith. On this rigidly mounted and secured bridge 15 and the plate 10 are mounted all the actuating mechanism between the magnets 7 8 and the index 6. There is also rigidly secured to the plate 10 a perpendicular hollow sleeve 16, which extends forwardly through the plates 9 and 10. The index 6 is secured to a spindle or shaft 17, which extends longitudinally through said sleeve 16 and is journaled in bearings formed by said sleeve and the bridge 15. Rigidly secured to this shaft or spindle 17 by means of a set-screw 18, between the termination of sleeve 16 and the bridge 15, is a collar 19, having a radially-extending stud 20, on which turns a bevel-pinion 21. This bevel-pinion gears at all times at diametrically-opposite points with two parallel bevel-gears 22 and 23, which rotate loosely on the shaft or spindle 17. Rigidly connected to the bevel-gear 22, so as to rotate therewith, is an advancing ratchet-wheel 24, and rigidly connected to the bevel-gear 23, so as to rotate therewith, is a reversing ratchet-wheel 25. The bevel-gears 22 and 23 are maintained in gear with the bevel-pinion 21 by a coiled spring 26. The spring 26, it will be observed, holds gear 23 against collar 19, which in turn presses upon gear 22 and holds it against the end of sleeve 16, or rather against a washer 39, interposed between gear 22 and sleeve 16. It will be noted that the gears 21, 22, and 23 constitute a species of epicyclic train.

In order to rotate the advancing ratchet 24, the magnet 7 is provided. The armature 27 of this magnet is carried by a vibrating armature-lever 28, which is carried by a rock-shaft 29, journaled at opposite ends by suitable provisions in the bridge 15 and metal plate 10. This armature-lever is vibrated in one direction when the armature 27 is attracted to the magnet 7 on the excitation of the same by the passage of an electric current and in the opposite direction by a spring 30. The long arm of this armature-lever 28 carries a pawl 31, pivotally mounted thereon, which engages with the advancing ratchet-wheel 24. This pawl is held in engagement with the ratchet-wheel by a spring 32. In an exactly similar manner the magnet 8 controls the movement of armature-lever 33, carrying its armature 34. Lever 33 has a pawl 35, which normally engages with the reversing-ratchet 25, being held in engagement therewith by a spring 32. The spring 26 holds the pinions 22 23 with sufficient friction to prevent their moving backward by reason of the friction of the pawls on the faces of the ratchet-teeth when the armature-levers move backward. Since the pawls 31 and 35 of the two armature-levers are on opposite sides of the spindle or shaft 17, it follows that the advancing and reversing ratchets 24 and 25 will be rotated in opposite directions by their respective pawls, and since the pawls are always in engagement with the ratchets it follows that the ratchets 24 and 25 cannot move backward. The rigid connection of the ratchets 24 and 25 with the turning bevel-gears 22 23, respectively, and the presence of the intermediate epicyclic bevel-pinion 21 enable the shaft or spindle 17 to be rotated in opposite directions. When the advancing ratchet 24 is rotated by the action of armature-lever 28, the loose gear 22 turns with it and carries the epicyclic bevel-pinion 21 round with it. The reversing-ratchet 25 and its gear 23 cannot turn with the ratchet 24, owing to the pawl 35. Consequently as the bevel-pinion 21 is carried around it rotates on its own axis by reason of its engagement with stationary bevel-gear 23. The shaft or spindle is thus caused to rotate forward in the same direction that the advancing ratchet 24 turns. When, however, the reversing-ratchet 25 is rotated by the action of its armature-lever 33, an exactly equivalent effect is produced, except that the shaft or spindle rotates backward, or in the opposite direction, the advancing ratchet 24 in this instance being prevented from backward rotation by the pawl 31. The arc through which the shaft or spindle 17 moves at each movement of either armature-lever depends upon the extent of movement of the armature-levers, the number of teeth on each of the ratchets 24 25, and the relative size of the epicyclic pinion 21 as compared with the gears 22 23. The extent of movement of the armature-levers is regulated by screws 36, which co-operate with two of the pillars 13. In the illustrated instrument the ratchets 24 25 have each thirty-two teeth, the movement of each armature-lever is sufficient to move its ratchet two teeth at a time, and each bevel-gear 22 23 is twice the diameter of and has twice as many teeth as the epicyclic pinion 21. Consequently the shaft or spindle 17 and the index 6 move through an arc equal to one thirty-second part of a complete rotation at each step. This length of step is a proper one in the illustrated indicator, since it corresponds with the number of conductive and non-conductive sections $g$ $h$ of the wind-vane circuit-controller.

It is obvious that the extent of each step of the shaft 17 and its index 6 can be regulated to any extent by the introduction of gearing between the ratchets 24 25 and the gears 22 23, respectively. It is only essential that the ratchets 24 25 should be so connected with the respective gears 22 23, as to rotate simultaneously therewith.

The novelty in the indicating-instrument just described resides wholly in the connections between the armature-levers and the index-carrying shaft, whereby the said shaft is rotated step by step, forward or back, as may be desired, without necessitating the lifting of the pawls from out of engagement with their respective ratchets. In other respects the indicating-instrument possesses no substantial novelty over the instruments described in the patents and application above referred to.

In order that the index 6 may move forward or back correspondingly with the movements of the wind-vane G, it is only necessary to place the actuating-magnets 7 and 8 in the branch circuits 2 and 3, respectively. The circuit-wire 2 is connected with the magnet 7, the circuit-wire 3 is connected with magnet 8, and both magnets are connected by a common return-wire 40 with the pole of the generator L opposite to that to which the conductor 1 is connected. It consequently follows that as long as the circuit-controlling disk H rotates in the direction of arrow 4 and the wire 2 is in operative connection with pin or stud I, the circuit through advancing magnet 7 will be made and broken by the passage over electrode M of each pair of the sections $g$ $h$ on the disk H, thereby advancing or turning forward the index 6 one step; but when the disk H rotates in the opposite direction and the wire 3 is in operative connection with pin or stud I the circuit through reversing-magnet 8 will be made and broken by the passage over electrode M of each pair of the sections $g$ $h$ on the disk H, thereby turning the index 6 back one step. Consequently the index 6 will move simultaneously and in unison with the wind-vane G, and the inspection of the indicating-instrument will always show the correct position of the wind-vane, and hence the direction of the wind.

It is quite evident that relay-magnets can be interposed in the electric circuits and the indicating-magnets can be operated by local circuits, as is shown in Letters Patent No. 420,057, above referred to, and by arranging the magnets 7 8 of several indicating-instruments in series the position of the wind-vane can be simultaneously indicated at a number of localities. Such and other known modifications can be introduced without affecting the present invention.

I claim as my invention—

1. In an electric indicating-instrument, a driven rotary spindle or shaft, a pinion carried by and rotating with said spindle or shaft and having an independent rotation on its own axis, and two gears concentric with said spindle or shaft, but free to rotate independently of said spindle or shaft, in combination with a ratchet-wheel capable of movement in one direction only, said ratchet-wheel being connected with one of said gears, a movable pawl co-operating with said ratchet-wheel and constantly engaging therewith, so as to prevent any backward rotation of the ratchet-wheel, a second ratchet-wheel capable of movement only in a direction opposite to that in which said first ratchet-wheel moves, said second ratchet-wheel being connected with the other of said gears, and a second movable pawl co-operating with said second ratchet-wheel and constantly engaging therewith, so as to prevent any backward rotation of said second ratchet-wheel, substantially as set forth.

2. In an electric indicating-instrument, the driven rotary index-carrying shaft or spindle, a collar fixed thereto so as to turn therewith, said collar having a radial stud, a bevel-pinion carried by and turning on said stud, and two bevel gears loosely turning on said shaft or spindle on opposite sides of said collar, said bevel-gears both meshing at all times with said bevel-pinion, in combination with two oppositely-toothed ratchet-wheels secured fast to said bevel-gears, respectively, the two swinging armature-levers on opposite sides of said spindle or shaft having pawls which co-operate with said ratchets, respectively, to drive the same and which constantly engage with their respective ratchets to prevent backward rotation thereof, and two electro-magnets which respectively control the movements of said armature-levers, substantially as set forth.

3. The spindle or shaft 17, carrying index 6, the sleeve 16, and bridge 15, in which said spindle or shaft is journaled, fixed collar 19, fixed to said shaft and having radial stud 20, bevel-pinion 21 on said stud, bevel-gears 22 23, loosely mounted on said shaft on opposite sides of said bevel-pinion and meshing therewith, and a coiled spring 26, surrounding said shaft 17 and bearing against said bridge 15 and said pinion 23, in combination with ratchets 24 25, electro-magnets 7 8, armature-levers 28 33, and pawls 31 35, substantially as set forth.

4. The vertical rotary metallic shaft rotated by a wind-vane, in combination with the circuit-controlling metallic disk carried by said shaft and insulated therefrom, said metallic disk constituting one terminal of an electric circuit, said disk having a series of sections of alternating electro conductive and non-conductive material arranged in a circle concentric with the axis of said disk, the operative surfaces of said sections being all in the same plane and all of said electro-conductive sections being in constant communication with said disk, whereby they are all in circuit with one pole of an electric generator, and a single electrode co-operating with said sections and constituting the opposite terminal of said electric circuit, substantially as set forth.

5. The pipe or tube B, having the insulating-sleeve J, in combination with the three collars *i j k* and the metallic sleeve *l*, all carried by said insulating-sleeve J, and insulated thereby from each other, substantially as set forth.

6. The pipe or tube B, having the insulating-sleeve J and the metallic sleeve *l*, carried thereby, in combination with the rotary metallic sleeves N Q, rotating together around said sleeve *l* and insulated from each other by insulating-sleeve P, said sleeves N and Q carrying electrodes O R, respectively, substantially as set forth.

7. The pipe or tube B, having the insulating-sleeve J, the metallic sleeve *l*, carried thereby, the rotary metallic sleeves N Q, rotating together around said sleeve *l* and insulated from each other by insulating-sleeve P, said sleeves N and Q carrying, respectively, electrodes O R, in combination with the circuit-making and circuit-breaking disk H, having pin or stud I, located between said electrodes O R and co-operating therewith, the three metallic collars *i j k*, carried by said sleeve J and insulated thereby from each other and from sleeve *l*, the three brackets *m n o*, carried by said collars respectively, the electrode M, carried by said bracket *m* and co-operating with said disk H, the contact-brushes S S, carried by bracket *o* and co-operating with metallic sleeve Q, the contact-brushes T T, carried by bracket *n* and co-operating with metallic sleeve N, the electric generator L, the conductor 1, connecting one pole of said generator with said bracket *m*, and the branch conductors 2 3, connecting the opposite pole of said generator with said brackets *o n*, respectively, substantially as set forth.

8. The wind-vane and its rotary shaft and electric-circuit-controlling mechanism controlled by said shaft, in combination with the inclosing casing surrounding said shaft and inclosing said circuit-controlling mechanism, substantially as set forth.

9. The support B, carrying the casing C D, in combination with the rotary wind-vane shaft F, passing into said casing, and electric-circuit-controlling mechanism controlled by said shaft and inclosed within said casing, substantially as set forth.

10. The vertical pipe or tube B, having a step-bearing *b* therein, the hollow closed casing C D, carried by said pipe or tube, and the vertical wind-vane shaft F, extending into said casing and turning on said step-bearing, said shaft having a wind-vane exterior to said casing, in combination with electric-circuit-controlling mechanism controlled by said shaft and located within said casing, substantially as set forth.

11. The vertical pipe or tube B and the hollow closed casing C D, carried by said shaft, said tube B having an aperture *s*, establishing communication between its interior and the interior of said casing, in combination with circuit-controlling mechanism within said casing, and electric conductors connected therewith and passing outwardly through said aperture *s*, substantially as set forth.

12. The vertical metallic pipe or tube B, having a step-bearing *b*, the hollow casing C D, carried by said tube B, and the vertical metallic wind-vane shaft F, extending into said casing and seating on said step-bearing, said wind-vane shaft carrying a wind-vane exterior to said casing, in combination with circuit-controlling mechanism located within said casing and carried by and insulated from said shaft F and tube B, substantially as set forth.

13. The casing C D, the shaft F, and the disk H, of electro-conductive material and constituting part of an electric circuit, in combination with the collar U of insulating material, substantially as set forth.

In witness whereof I have hereunto signed my name in the presence of two subscribing witnesses.

HENRY JANSEN HAIGHT.

Witnesses:
ARTHUR S. BROWNE,
CARLETON E. SNELL.